US008897584B2

(12) United States Patent
Morioka

(10) Patent No.: US 8,897,584 B2
(45) Date of Patent: Nov. 25, 2014

(54) IMAGE PROCESSING APPARATUS AND IMAGE PROCESSING METHOD

(75) Inventor: Kiyonori Morioka, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 363 days.

(21) Appl. No.: 13/346,477

(22) Filed: Jan. 9, 2012

(65) Prior Publication Data
US 2012/0189218 A1 Jul. 26, 2012

(30) Foreign Application Priority Data

Jan. 26, 2011 (JP) ................................. 2011-14141

(51) Int. Cl.
G06K 9/36 (2006.01)
H04N 7/01 (2006.01)

(52) U.S. Cl.
CPC ........... *H04N 7/0125* (2013.01); *H04N 7/0102* (2013.01)
USPC .......................................... 382/236; 382/299

(58) Field of Classification Search
USPC .......................................... 382/236, 298–300
See application file for complete search history.

(56) References Cited

U.S. PATENT DOCUMENTS

| 5,754,226 | A | 5/1998 | Yamada et al. | |
|---|---|---|---|---|
| 6,285,804 | B1* | 9/2001 | Crinon et al. | 382/299 |
| 7,876,477 | B2 | 1/2011 | Toma et al. | |
| 8,264,565 | B2* | 9/2012 | Sakaguchi et al. | 348/222.1 |
| 2003/0002707 | A1* | 1/2003 | Reed et al. | 382/100 |
| 2005/0259740 | A1* | 11/2005 | Kobayashi et al. | 375/240.16 |
| 2006/0188024 | A1* | 8/2006 | Suzuki et al. | 375/240.23 |
| 2008/0002239 | A1* | 1/2008 | Toma et al. | 358/474 |
| 2009/0129704 | A1* | 5/2009 | Toda | 382/299 |
| 2009/0220173 | A1* | 9/2009 | Wajs | 382/284 |
| 2010/0020210 | A1* | 1/2010 | Tsunekawa et al. | 348/294 |
| 2010/0128170 | A1* | 5/2010 | Hirai et al. | 348/441 |
| 2010/0316127 | A1* | 12/2010 | Yokoyama | 375/240.16 |
| 2012/0051667 | A1* | 3/2012 | Kang et al. | 382/299 |
| 2012/0133785 | A1* | 5/2012 | Wasserbauer et al. | 348/208.4 |

FOREIGN PATENT DOCUMENTS

| JP | 07-007655 A | 1/1995 |
|---|---|---|
| JP | 08-018964 A | 1/1996 |
| JP | 8-172568 A | 7/1996 |
| JP | 2008-33914 A | 2/2008 |
| JP | 2010-251882 A | 11/2010 |

OTHER PUBLICATIONS

Japanese Office Action, Japanese Patent Application No. 2011-014141 dated Jul. 1, 2014.

* cited by examiner

Primary Examiner — Jingge Wu
(74) Attorney, Agent, or Firm — Arent Fox LLP

(57) ABSTRACT

An image processing apparatus may be configured to detect motion based on a first block image within a first frame image included in first reduced image data sampled at a first sampling point and a first reference block image within a first reference frame image included in the first reduced image data; and extract a second block image when detecting that the first block image and the first reference block image are not moving and generate first image data corresponding to the first block image based on the first block image and the second block image. The second block image is in a second frame image included in second reduced image data sampled at a second sampling point that is different from the first sampling point and is at substantially the same time as the time of the first block image or the first reference block image.

11 Claims, 13 Drawing Sheets

PP

IMAGE PROCESSING APPARATUS AND IMAGE PROCESSING METHOD

CROSS-REFERENCE TO RELATED APPLICATIONS

This application claims the benefit of priority from Japanese Patent Application No. 2011-14141 filed on Jan. 26, 2011, the entire contents of which are incorporated herein by reference.

BACKGROUND

1. Field

Embodiments relate to image processing apparatuses and image processing methods.

2. Description of Related Art

There is provided an imaging/reproducing apparatus such as a digital camera and a camcorder which have an image sensor.

An imaging/reproducing apparatus may include an image processing apparatus which takes an image by changing an imaging phase optically or electronically and scales up the image with a high quality when reproducing the image.

The related art is disclosed in Japanese Unexamined Patent Application Publication Nos. 08-172568 and 2008-033914.

SUMMARY

According to one aspect of the embodiments, an image processing apparatus includes a demultiplexing circuit to sample image data at a first sampling point, reduce sampled image data to generate first reduced image data, sample the image data at a second sampling point that is different from the first sampling point and reduce sampled image data to generate second reduced image data.

Additional advantages and novel features of the invention will be set forth in part in the description that follows, and in part will become more apparent to those skilled in the art upon examination of the following or upon learning by practice of the invention.

DESCRIPTION OF EMBODIMENTS

A sensor having a higher resolution for still images than that for moving images may be applied to an imaging/reproducing apparatus and the imaging/reproducing apparatus may include a function of imaging a still image and moving images contemporaneously.

In an imaging/reproducing apparatus, one upper limit for moving images is the resolution of the reproducing apparatus. Therefore, moving images are recorded while keeping the resolution of the sensor without acquiring a high resolution by performing up-conversion on the recorded pixels.

When a next-generation high resolution 4k2k (4000×2000 (3840×2160, 4096×2160) pixel) display panel is used, an imaging apparatus, which supports full high vision (full HD: 1920×1080 pixel: 2k1k) viewing and 4k2k viewing having the quadruple resolution of the full high vision, may be provided.

Moving image data may be down-converted to a display device resolution (such as full HD) and may be recorded.

A reproducing apparatus may perform up-conversion on the down-converted moving image data by using higher resolution producing system to produce an image having a higher definition resolution (such as 4k2k) than the recorded resolution.

The data down-converted to the full HD may be recorded in a recording medium such as a semiconductor memory or an optical and/or magnetic disk. The data down-converted to the full HD may be distributed by broadcasting using radio waves or a network such as the Internet.

Videos having two resolutions of 4k2k and full HD respectively may be recorded. Alternatively, a video may be down-converted and may be recorded as one with full HD. The video may be reproduced by a 4k2k display device using a high-quality up-conversion technology such as Super-resolution.

Figure 1:
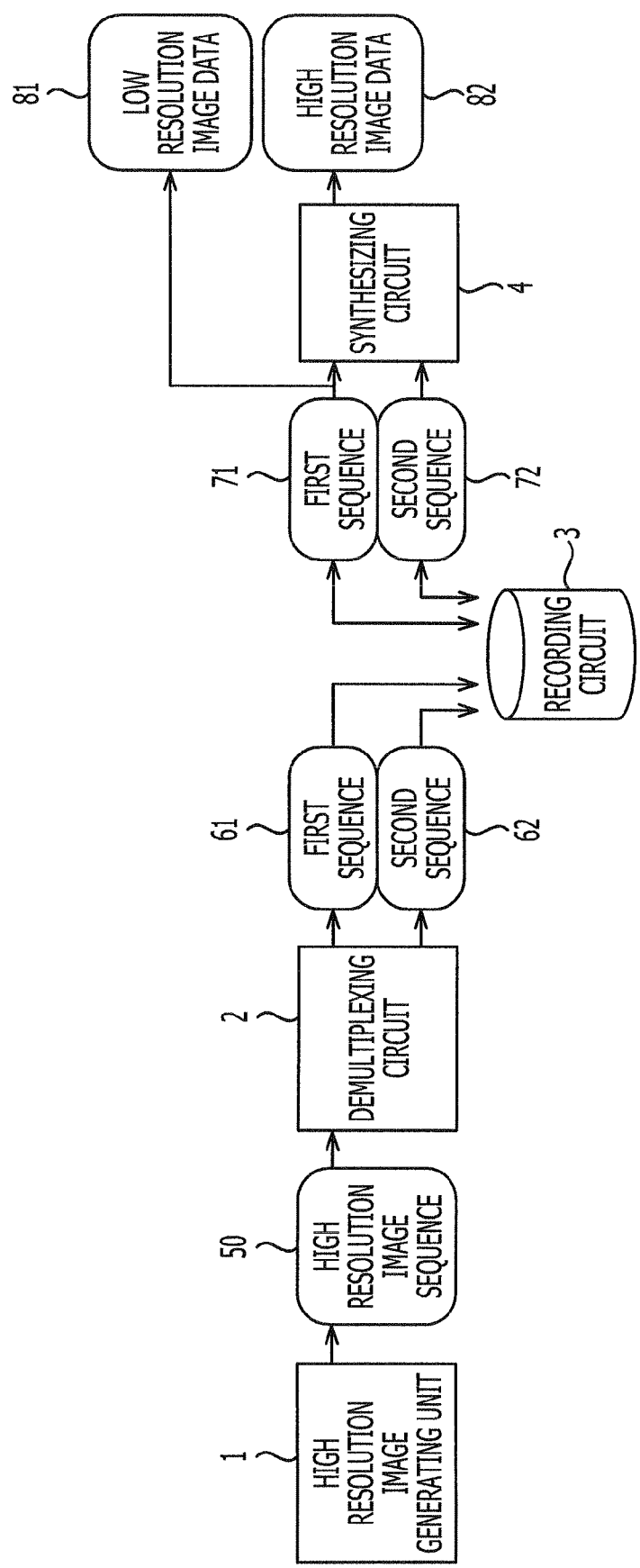
FIG. 1 illustrates an exemplary system.

FIG. 1 illustrates an exemplary system. The system illustrated in FIG. 1 includes a high resolution image generating circuit 1, a demultiplexing circuit 2, a recording circuit 3, and a synthesizing circuit 4.

High-resolution image generating unit 1 may be an image sensor, for example. Image data having a high resolution such as 4k2k, for example, a high-resolution image sequence 50 is input to the demultiplexing circuit 2.

The demultiplexing circuit 2 receives the high-resolution image sequence 50, generates first reduced image data such as a first sequence 61 and second reduced image data such as a second sequence 62, and records them in the recording unit 3.

The synthesizing circuit 4 synthesizes first reduced image data in the recording unit 3, for example, a first sequence 71 and second reduced image data in the recording unit 3, for example, a second sequence 72 to generate high resolution image data 82. Low resolution image data 81 may be the first sequence 71 from the recording unit 3.

The first sequence 71 from the recording unit 3 may be used as low resolution image data 81 to be displayed on a full HD panel, for example. The output of the synthesizing circuit may be used as high resolution image data 82 to be displayed on a 4k2k panel.

The recording unit 3 which records the first sequence 61 and second sequence 62 from the demultiplexing circuit 2 may be a recording medium such as a semiconductor memory and an optical and/or magnetic disk.

The first sequence 61 and second sequence 62 from the demultiplexing circuit 2 may be recorded in the recording unit 3 or may be distributed by broadcasting over radio waves or a network such as the Internet.

The demultiplexing circuit 2 and synthesizing circuit 4 may be provided in one camcorder which records and reproduces moving images. For example, the demultiplexing circuit 2 may be provided in an imaging camera, and the synthesizing circuit 4 may be provided in a generating apparatus such as a receiving apparatus for broadcasting.

Figure 2:
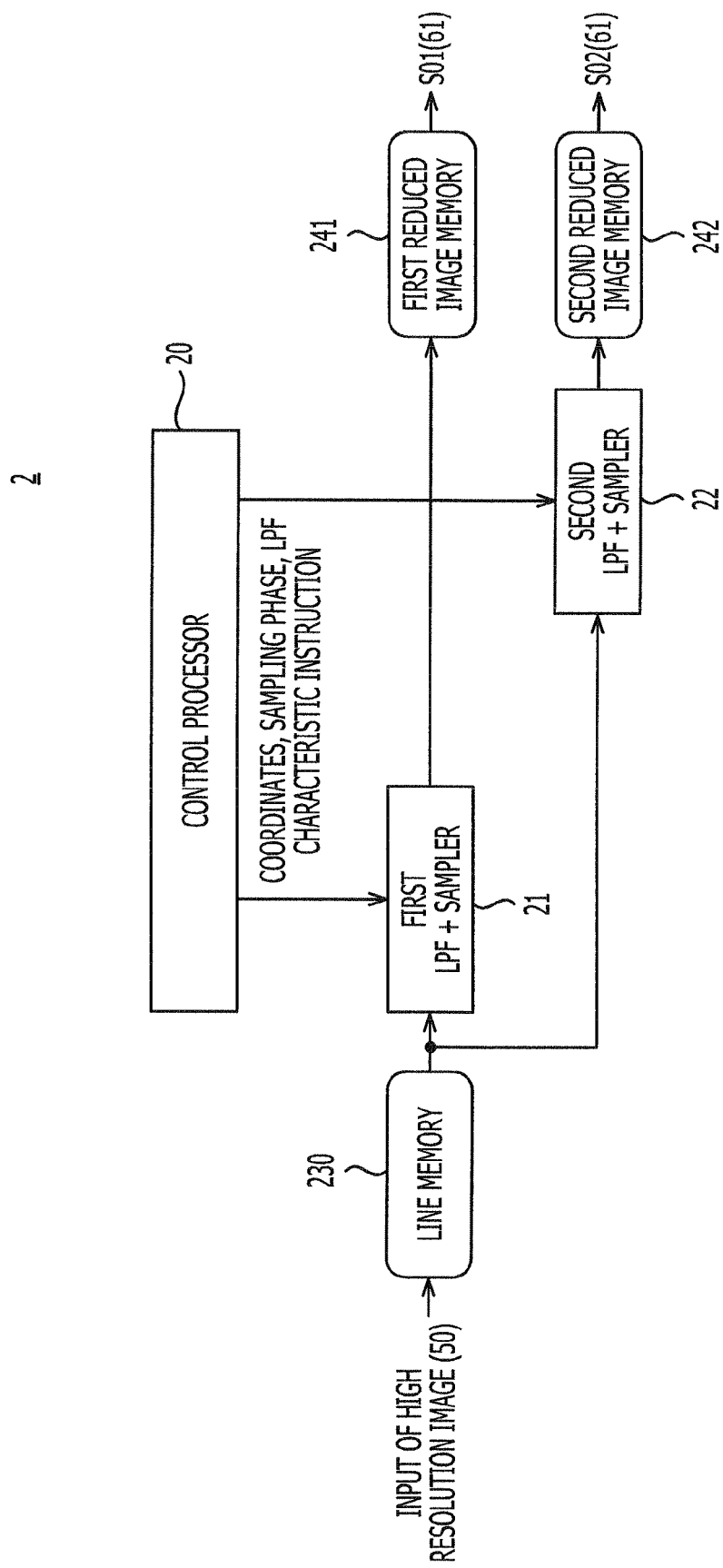
FIG. 2 illustrates an exemplary image processing apparatus.

FIG. 2 illustrates an exemplary image processing apparatus. The image processing apparatus illustrated in FIG. 2 may include the demultiplexing circuit 2. The demultiplexing circuit 2 includes a control processor 20, first and second low pass filters and samplers (LPF+sampler) 21 and 22, and a line memory 230.

A first reduced image memory 241 stores the first sequence SO1 (61). A second reduced image memory 242 stores the second sequence SO2 (62).

The demultiplexing circuit 2 includes a line memory 230 which receives a high resolution image from the high-resolution image generating unit 1, for example, a 4k2k image, and a first LPF+sampler 21 and a first LPF+sampler 22 which process an output of the line memory 230.

The first LPF+sampler 21 and first LPF+sampler 22 may perform LPF+skipping sampling.

Figure 3:
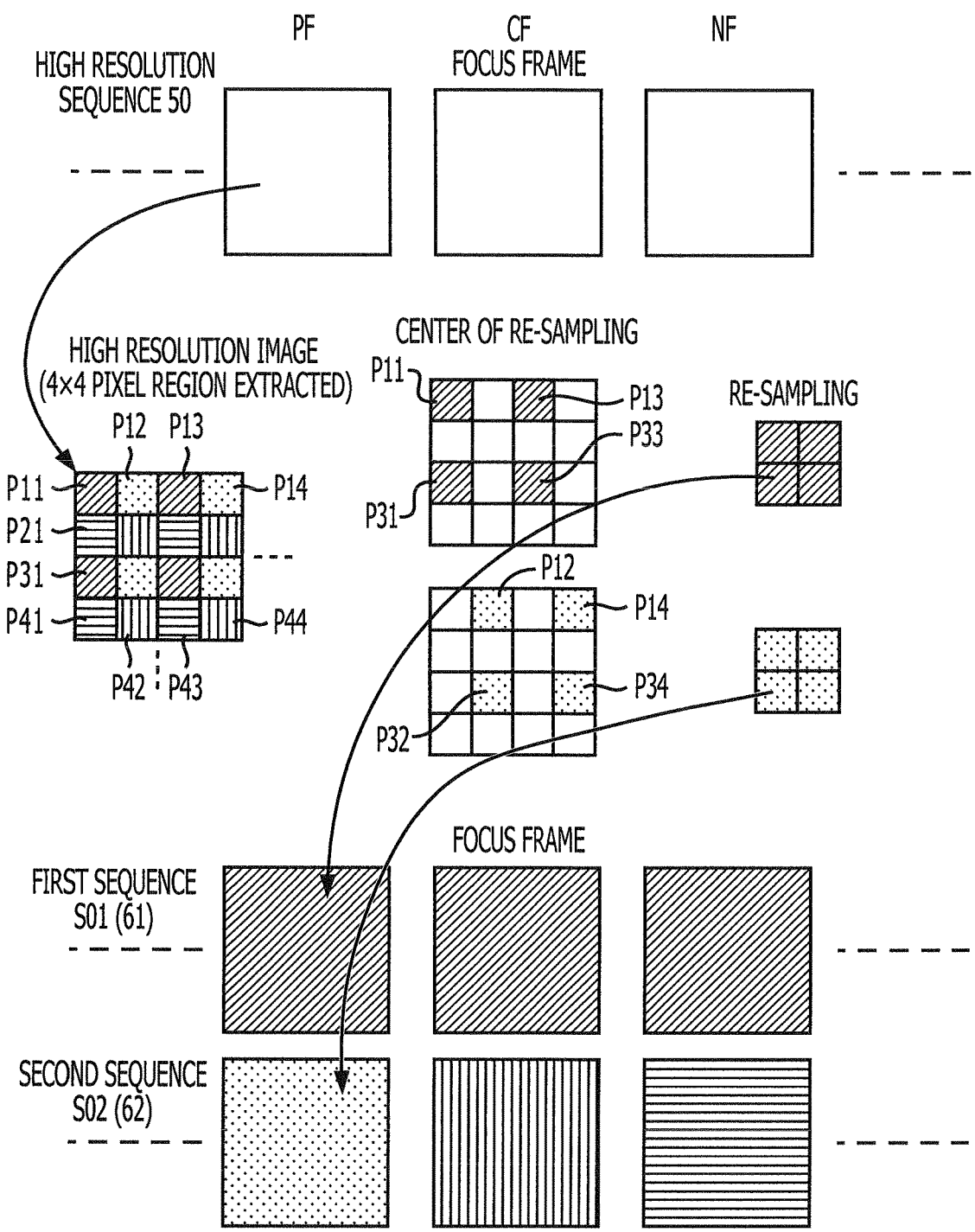
FIG. 3 illustrates an exemplary operation of an image processing apparatus.
Figure 4:
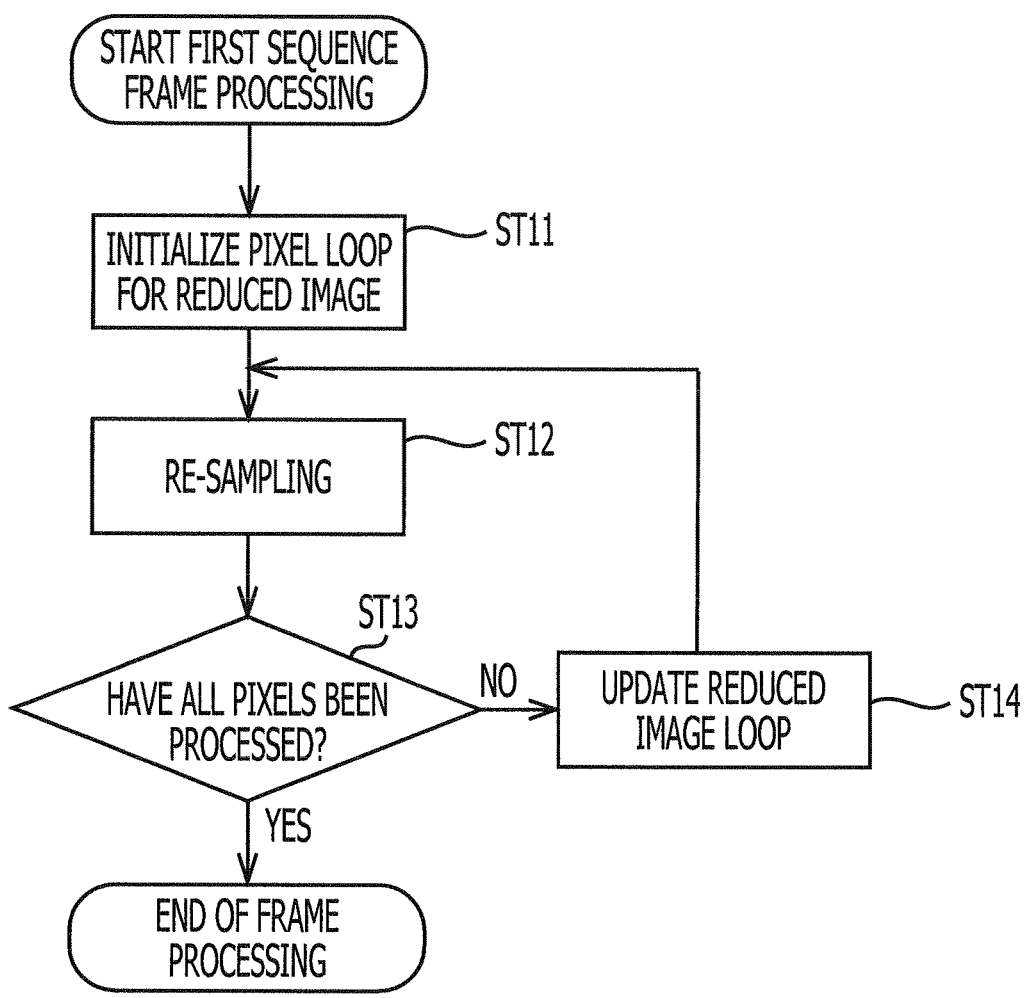
FIG. 4 illustrates an exemplary image process.
Figure 5:
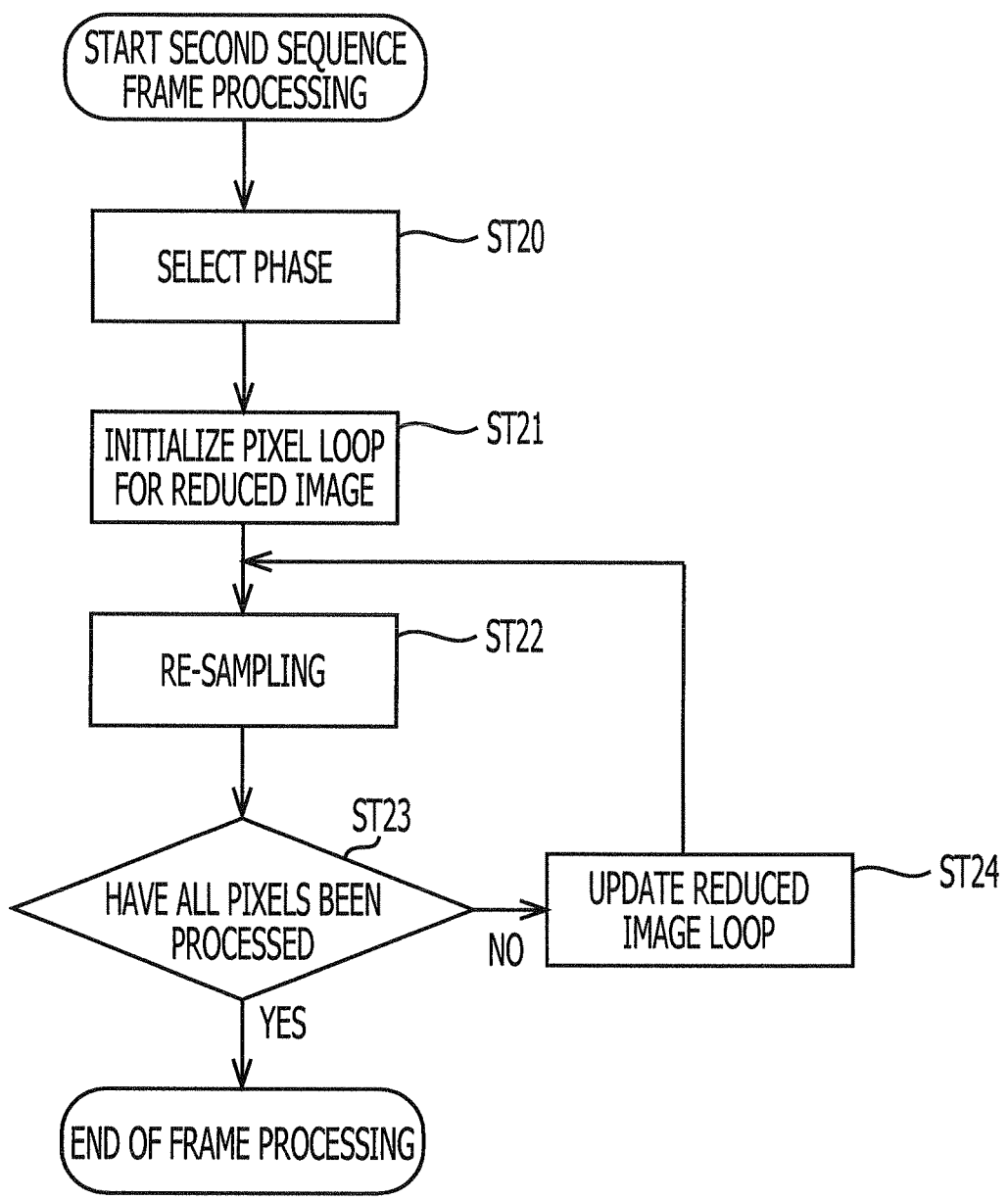
FIG. 5 illustrates an exemplary image process.

FIG. 3 illustrates an exemplary operation of an image processing apparatus. The image processing apparatus illustrated in FIG. 2 may perform the operation illustrated in FIG. 3. FIG. 4 and FIG. 5 may illustrate an exemplary image process. The image processing apparatus illustrated in FIG. 2 may perform image process illustrated in FIG. 4 or FIG. 5.

The ratio of the resolutions of a high resolution image such as a 4k2k image and a reduced image such as a full HD image may be 4:1. FIG. 3 illustrates phases when a re-sampling pixel is computed (LPF) by computing 4k2k pixels corresponding to focus pixels with peripheral pixels. 4×4 pixels of the 4k2k pixels may be extracted.

The high-resolution image sequence 50 is supplied through the line memory 230 to the first LPF+sampler 21 and second LPF+sampler 22. The LPF has a certain size about the center pixel, and the size may be 3×3 or 5×5 or an even number, for example.

For example, 3×3 to 5×5 pixel data including a pixel P11 at the upper-left of the 4×4 pixel region illustrated in FIG. 3 and peripheral upper and lower and left and right pixels of the pixel P11 may be input to the LPF.

The grid cells (P11, P12, . . . , and P44) of the 4×4 pixel region include pixels of a reduced image and the center of the pixel barycenter of sampling from a high resolution sequence.

When skipping sampling is to be performed without LPF processing, the grid cells may correspond to reduced pixels and the corresponding nearest pixels. For example, when the sampling kernel has an n×m pixel region, the grid cells may include the center of reduced pixels and the barycenter of the corresponding region before reduced.

As illustrated in FIG. 3, the 4×4 pixel region of P11 to P44 is extracted from a high resolution image of the high-resolution image sequence 50, and the 4×4 pixel region including P11 to P44 is supplied to the first LPF+sampler 21 and second LPF+sampler 22 along with surrounding pixels for computing an LPF kernel.

In the LPF, when a pixel outside of the frame is to be referred, a padding may be performed on valid pixels in the boundary and lacking pixels may be generated virtually, for example. Other methods may be used instead of the padding.

The first LPF+sampler 21 selects the four pixels P11, P13, P31, and P33 denoted by diagonal hatching as the center (barycenter), for example, from the supplied 4×4 pixel region P11 to P44 and peripheral pixels in the target frame such as a previous frame PF of the current frame CF and re-samples the image data.

The first LPF+sampler 21 also selects the four pixels P11, P13, P31, and P33 denoted by diagonal hatching, for example, as the barycenter from the 4×4 pixel region P11 to P44 in the current frame CF and the next frame NF of the current frame and re-samples the image data.

The frames PF and NF may be the previous and subsequent frames of the frame CF. Under a condition that the phases of the second sequence including the previous two frames and the subsequent two frames are all different, arbitrary previous and subsequent frames may be the frames PF and NF,.

For example, the center of the cross shape of the four pixels may be set as the barycenter of the first sequence. The center of four pixels such as the upper left pixel, upper right pixel, lower left pixel and lower right pixel may be set as the barycenter of the second sequence.

As illustrated in FIG. 4, the frame process on the first sequence is started, the pixel loop of the reduced image is initialized in an operation ST11. In an operation ST12, re-sampling such as LPF+skipping sampling may be performed at the first sampling point.

For example, in the operation ST11 and the operation ST12 illustrated in FIG. 4, the four pixels P11, P13, P31 and P33 denoted by a diagonal hatching may be selected as the barycenter from the 4×4 pixel region P11 to P44 illustrated in FIG. 3, and the image data may be re-sampled.

In an operation ST13, whether all pixels have been processed or not is determined. When all pixels have not been processed, the reduced image loop is updated in an operation ST14. The process returns to the operation ST12. When all pixels have been processed, the frame process ends.

For example, the first LPF+sampler 21 may re-sample the image data corresponding to the pixel at a skipping position in the frame, and the re-sampled image data may be output through the first reduced image memory 241. The image data output from the first reduced image memory 241 may correspond to the first sequence 61 illustrated in FIG. 1.

For example, the second LPF+sampler 22 may select four pixels P12, P14, P32 and P34 denoted by a dot pattern as the barycenter from the 4×4 pixel region P11 to P44 in the previous frame PF of the current frame and may re-samples the image data.

For example, the second LPF+sampler 22 may select the four pixels P22, P24, P42, and P44 denoted by vertical hatching as the barycenter from the 4×4 pixel region P11 to P44 in the current frame CF and may re-sample the image data.

For example, the second LPF+sampler 22 may select the four pixels P21, P23, P41, and P43 denoted by horizontal hatching as the barycenter from the 4×4 pixel region P11 to P44 in the next frame NF of the current frame and may re-sample the image data.

For example, the four pixels P12, P14, P32, and P34 denoted by a dot pattern may be selected as the barycenter from the 4×4 pixel region P11 to P44 in the further next frame of the frame NF, like the frame PF, and the image data may be re-sampled. The same process may be repeated.

The pixels P12, P14, P32 and P34, pixels P22, P24, P42 and P44, or pixels P21, P23, P41 and P43 may correspond to the second sampling point.

As illustrated in FIG. 5, when frame process on the second sequence is started, a phase is selected in an operation ST20. For example, the pattern for capturing four pixels selected from the 4×4 pixel region P11 to P44 illustrated in FIG. 3 is selected, the pattern including the three phases (patterns) of the dot pattern, vertical hatching and horizontal hatching.

In an operation ST21, the pixel loop of the reduced image may be initialized. In an operation ST22, re-sampling may be performed.

In the operation ST21 and the operation ST22, four pixels are selected as the barycenter based on the pattern selected in the operation ST20 from the 4×4 pixel region P11 to P44 illustrated in FIG. 3, and the image data may be re-sampled.

In an operation ST23, whether all pixels have been processed or not is determined. When all pixels have been processed, the reduced image loop is updated in an operation ST24. The process returns to the operation ST12. When all pixels are processed, the frame processing may end.

The second LPF+sampler 22 re-samples the image data three frames in a cycle and outputs the re-sampled image data through the second reduced image memory 242. The image data output from the second reduced image memory 242 may correspond to the second sequence 62 illustrated in FIG. 1.

The entire process may be performed frame by frame. Alternatively, one frame of the first sequence and one frame of the second sequence may be processed contemporaneously.

When the process moves to the next frame, the sampling phase of the second sequence may change. For example, 3 types of sampling position may be applied cyclically. For example, with a reduction ratio of 4:1, the process may be performed every 4×4 pixels. The process may perform sequentially within one frame. The process may be performed in other units instead of every 4×4 pixels.

The high-resolution image sequence 50 supplied to the demultiplexing circuit 2 may be a 4k2k high resolution image, for example. The first and second sequences 61 and 62 output from the demultiplexing circuit 2 may be a full HD low resolution image, for example.

Figure 6:
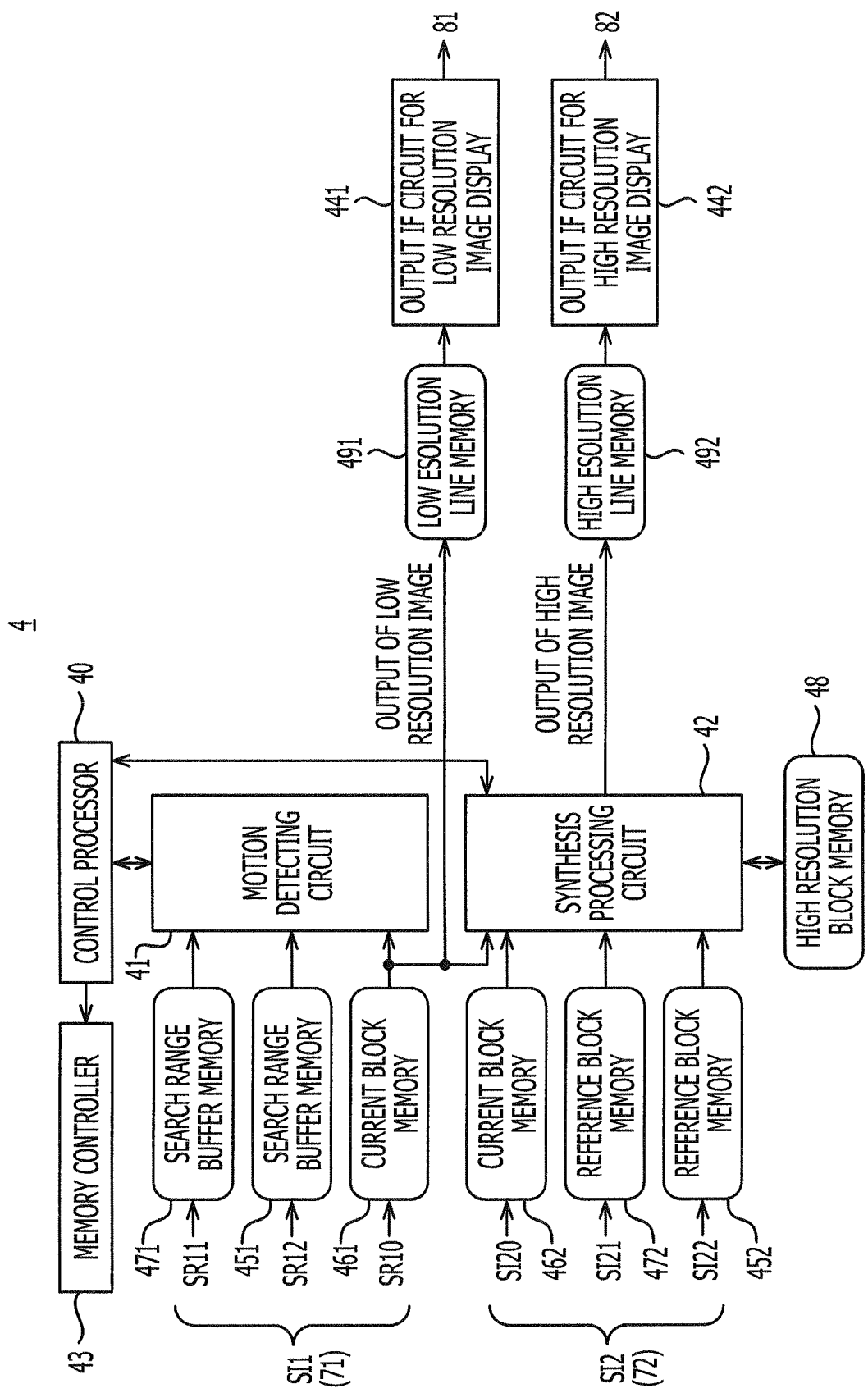
FIG. 6 illustrates an exemplary an image processing apparatus.

FIG. 6 illustrates an exemplary image processing apparatus. The image processing apparatus illustrated in FIG. 6 may include a synthesizing circuit 4 illustrated in FIG. 1. The image processing apparatus illustrated in FIG. 6 includes a control processor 40, a motion detecting circuit 41, a synthesis processing circuit 42, a memory controller 43, an output IF circuit for low resolution image display 441, an output IF circuit for high resolution image display 442, and a high resolution block memory 48.

The synthesizing circuit 4 includes the control processor 40 and the motion detecting circuit 41 which is controlled by the control processor 40, the synthesis processing circuit 42, the memory controller 43 and a memory. The motion detecting circuit 41, synthesis processing circuit 42 and memory controller 43 may be controlled by the control processor 40.

The motion detecting circuit 41 receives a first reference input SR11 of the first sequence through a search range buffer memory 471 and a second reference input SR12 of the first sequence through a search range buffer memory 451. The motion detecting circuit 41 receives a first sequence input SI10 through a current block memory 461.

The synthesis processing circuit 42 receives a first reference input SR21 of the second sequence through a reference block memory 472 and a second reference input SR22 of the second sequence through a reference block memory 452.

The synthesis processing circuit 42 receives a current input SI20 of the second sequence SI2 through the current block memory 462 and a current input SI10 of the first sequence SI1 through the current block memory 461.

The first sequence input SI10 input through the current block memory 461 is output as low resolution image data 81 through low resolution line memory 491 and the output IF (interface) circuit for low resolution display 441.

The synthesis processing circuit 42 exchanges data with the high resolution block memory 48. The output of the synthesis processing circuit 42 is output as high resolution image data 81 through the high resolution line memory 492 and output IF circuit for high resolution display 442.

The current input SI10 of the first sequence SI1, the first reference input SR11 of the first sequence and the second reference input SR12 of the first sequence may correspond to the first sequence SI1 (71).

The input SI10 may correspond to the current frame input of the first sequence SI1 The input SR11 may correspond to the one previous frame input of the current frame. The input SR12 may correspond to one subsequent frame input of the current frame.

The current input SI20 of the second sequence, the first reference input SR21 of the second sequence and the second reference input SR22 of the second sequence may correspond to the second sequence SI2 (72).

The input SI20 may correspond to the current frame input of the second sequence SI2. The input SR21 may correspond to the one previous frame input of the current frame. The input SR22 may correspond the one subsequent frame input of the current frame.

Figure 7:
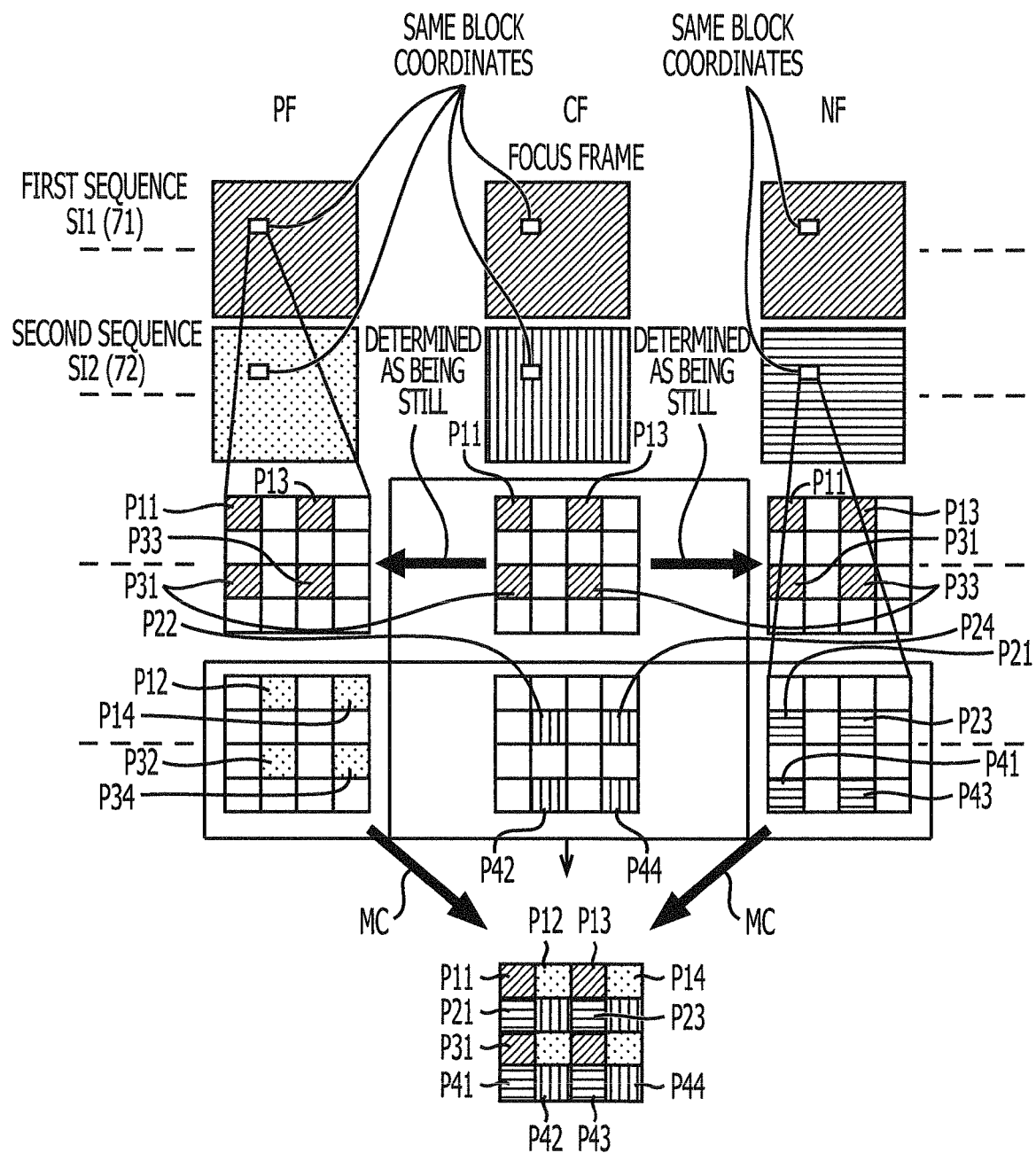
FIG. 7 illustrates an exemplary image processing.
Figure 8:
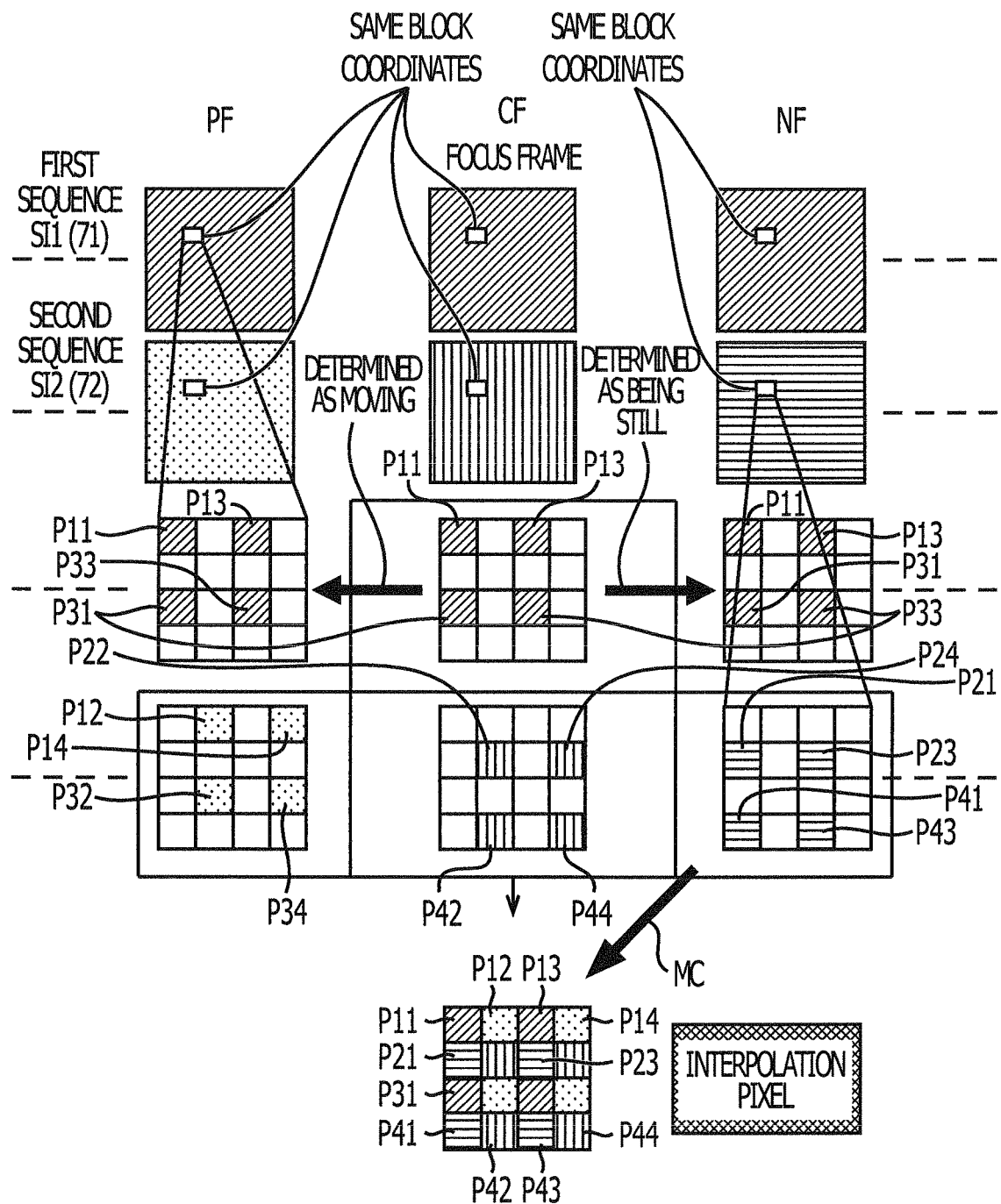
FIG. 8 illustrates an exemplary image processing.
Figure 9:
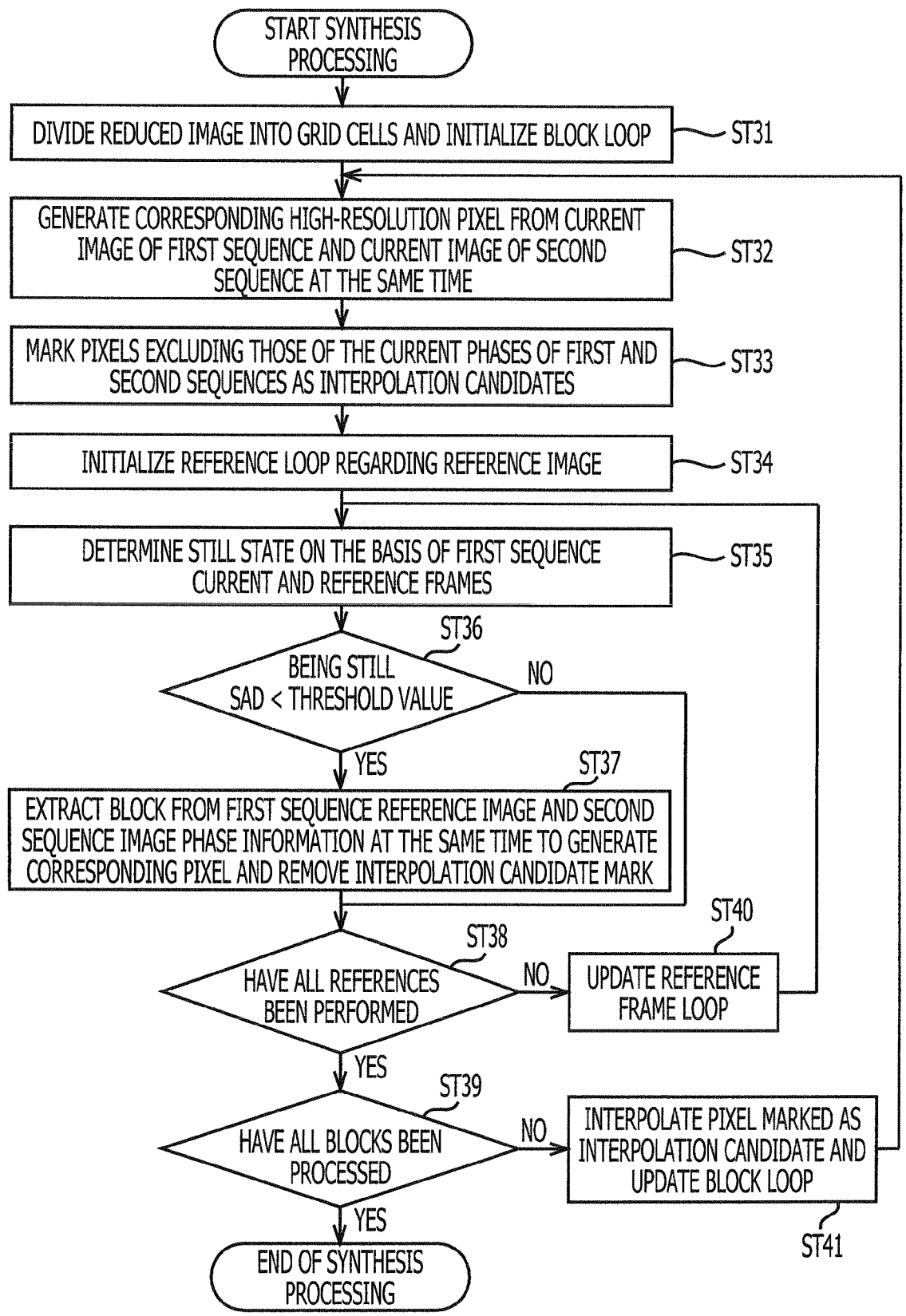
FIG. 9 illustrates an exemplary image processing.

FIG. 7, FIG. 8 and FIG. 9 illustrate an exemplary image process. The image processing apparatus illustrated in FIG. 6 may perform the image process illustrated in FIG. 7, FIG. 8 and FIG. 9.

For example, the resolution ratio of a high resolution image (4k2k) and a reduced image (full HD) may be 4:1. Referring to FIG. 7 and FIG. 8, for example, the first sequence 71 (SI1) and second sequence 72 (SI2) of a reduced image may be synthesized into high resolution image data 82.

In FIG. 7, it is determined that the pixels are still in target frames such as the previous and subsequent frames PF and NF of the current frame CF. Referring to FIG. 8, it is determined that the pixels in the previous frame PF are moving and it is determined that the pixels in the subsequent frame NF are still. In FIG. 7 and FIG. 8, the grid (lattice) may have a fractional-pel accuracy of 0.5 on a reduced image and may support a high resolution pixel grid.

A frame is divided into grid cells, and it is determined that one block position such as block coordinates is still in the current frame CF and the previous and subsequent frames PF and NF in the first sequence SI1(71).

For example, it may be determined that the pixels P11, P13, P31 and P33 on the lattice of the frames PF and CF of the first sequence SI1 and the pixels P11, P13, P31 and P33 of the frames CF and NF of the first sequence SI1 are still.

Referring to FIG. 7, the pixels P11, P13, P31 and P33 of the first sequence SI1 may be determined as being still in the three frames PF, CF and NF. The phase information is used for synthesis.

For example, in three-frame circulation in which the process go round three patterns of the dot pattern, vertical hatching and horizontal hatching illustrated in FIG. 3 and FIG. 5 are circulating, the frames PF, CF and NF of the second sequence SI2 (72) may be processed as reference images.

The pixels P11, P13, P31 and P33 of the SI1, the pixels P12, P14, P32 and P34 of the frame PF of the SI2, the pixels P22, P24, P42 and P44 of the frame CF and the pixels P21, P23, P41 and P44 of the frame NF are referred.

As illustrated in FIG. 7, the previous and subsequent frames PF and NF of the second sequence SI2 are used as reference images to perform motion compensation (MC) to synthesize a 4k2k high resolution image, for example.

Referring to FIG. 8, the pixels P11, P13, P31 and P33 of the first sequence SI1 are determined as having been moved from the frame PF to the frame CF and being still from the frame CF to the frame NF.

Because the subsequent frame NF of the current frame CF is determined as being still, the pixels P11, P13, P31 and P33 of the SI1, the pixels P22, P24, P42 and P44 of the CF of the SI2, and the pixels P21, P23, P41 and P44 of the NF are referred.

Because it is determined that pixels are moving from the previous frame PF to the current frame CF, the interpolation pixels for the pixels P21, P23, P41 and P43 are generated without reference to pixels of the PF of the second sequence SI2 to synthesize a 4k2k high resolution image, for example. If pixels are determined as being moved, the interpolation may be performed without using the current frame CF and the previous frame PF of the second sequence SI2 corresponding to the reference frame.

The interpolation pixels may be generated by handling the one previous and subsequent frames PF and NF of the current frame CF as reference images. The interpolation pixels may be generated by handling the previous or subsequent two frames as reference images. The interpolation pixels may be generated with reference to many images. The synthesis may include process that uses a weighted average or a frame at the nearest time, for example.

As illustrated in FIG. 9, when the synthesis process is started, a reduced image is divided into grid blocks, and the block loop is initialized in an operation ST31. The process moves to an operation ST32.

In the operation ST32, a high resolution image is generated based on the current image of the first sequence and the current image of the second sequence at the same time. The process moves to an operation ST33. In the operation ST33, an interpolation candidate and a mark are generated for the pixels excluding those of the current phases of the first and second sequences.

In an operation ST34, a reference loop regarding reference images is initialized. In an operation ST35, it may be determined that the current image of the first sequence is still in the reference frame.

In an operation ST36, the similarity between images is evaluated. The total sum (SAD: Sum of Absolute Difference) of the luminance differences for the region from which the image to be compared is extracted is compared with a threshold value. The corresponding pixels may be determined as being at the more similar positions, for example, as being a closer state to a still state as the SAD decreases. Other methods such as the sum of squared difference (SSD) of the luminance differences may be used.

In an operation ST36, if the pixels are determined as being still, for example, as SAD <threshold value, the process moves to an operation ST38 through operation ST37. If the pixels are determined as not being still, that is, if SAD is greater than or equal to the threshold value, for example, the process moves to the operation ST38.

the second sequence reference image at the same time as that of the first sequence reference image to generate the corresponding pixels, and its interpolation candidate mark is removed. The process moves to the operation ST38. In the operation ST38, whether all reference images have been processed or not is determined. If all reference images have been processed, the processing moves to an operation ST39.

In the operation ST39, whether all blocks have been processed or not is determined. When all blocks have been processed, the synthesis process may end, and the process moves to an operation ST41.

In the operation ST38, if all reference images have not been processed, the processing moves to the operation ST40. The loop for the reference frames is updated, and the process returns to the operation ST35. Substantially the same process may be repeated until the process on reference images ends.

In the operation ST41, the pixels marked as interpolation candidates are interpolated, and the block loop is updated. The process may return to the operation 32, and substantially the same process may be repeated.

The image processing apparatus may record or reproduce a 4k2k image with a high resolution and record or reproduce a full HD image with a low resolution.

According to the image processing apparatus, the amount of data and the number of processes may be less when high-resolution data is recorded or reproduced. A high-resolution moving image and a low-resolution moving image are recorded or reproduced.

For example, the image processing apparatus may perform data recording/reproduction with about ⅔ of the amount of data and at least one of ⅔ of the number of processes or ⅔ of the size of circuit of the simultaneous recording of 4k2k and full HD images by a reproducing apparatus which reproduces 4k2k and full HD images. The video to be reproduced by a full HD reproducing apparatus may be easily demultiplexed.

For example, the image processing apparatus may record or reproduce data with about ½ of the amount of data and at least one of the number of processes or the size of circuit of the recording of a high-resolution data by a 4k2k-only apparatus.

Figure 10:
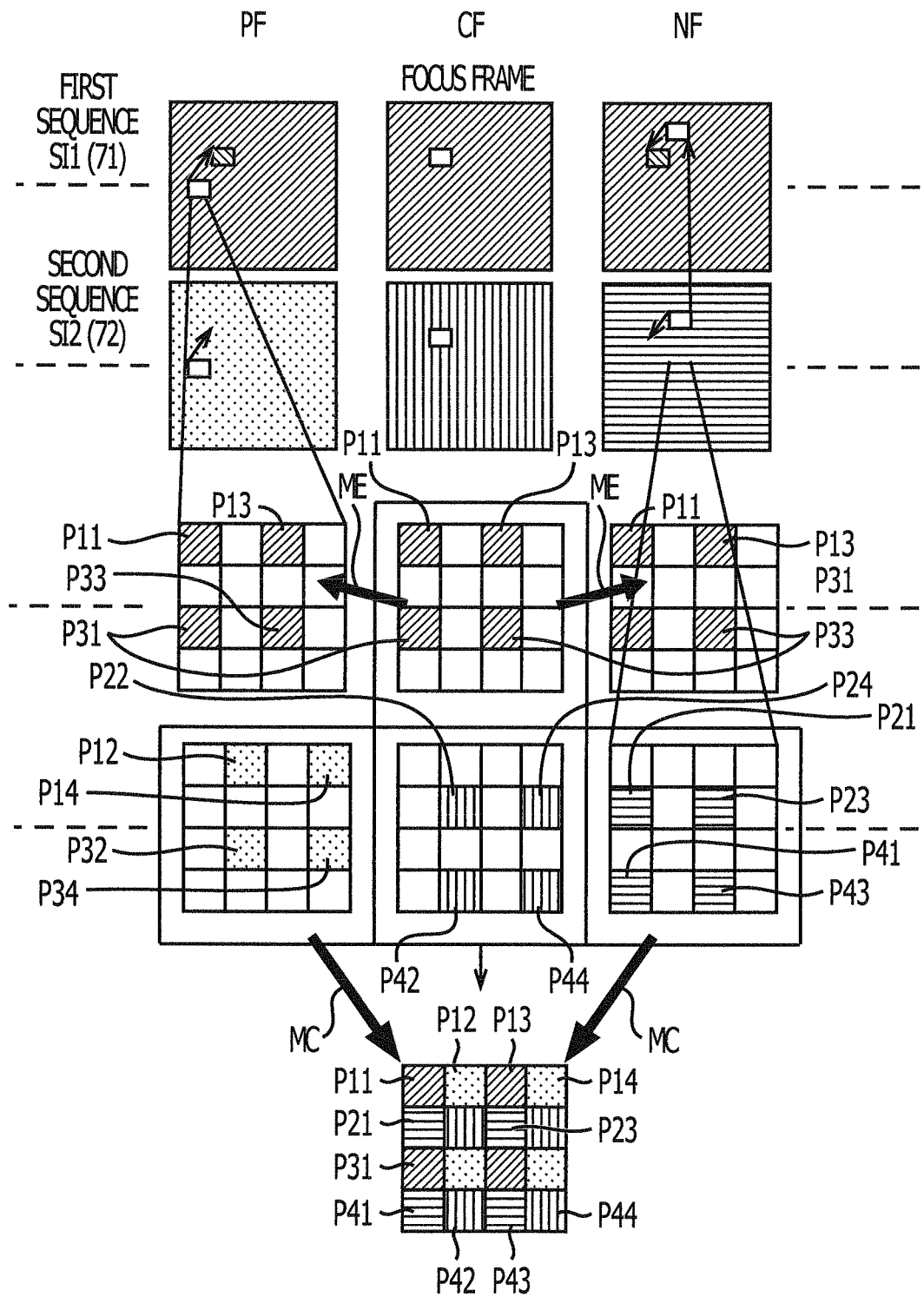
FIG. 10 illustrates an exemplary image processing.
Figure 11:
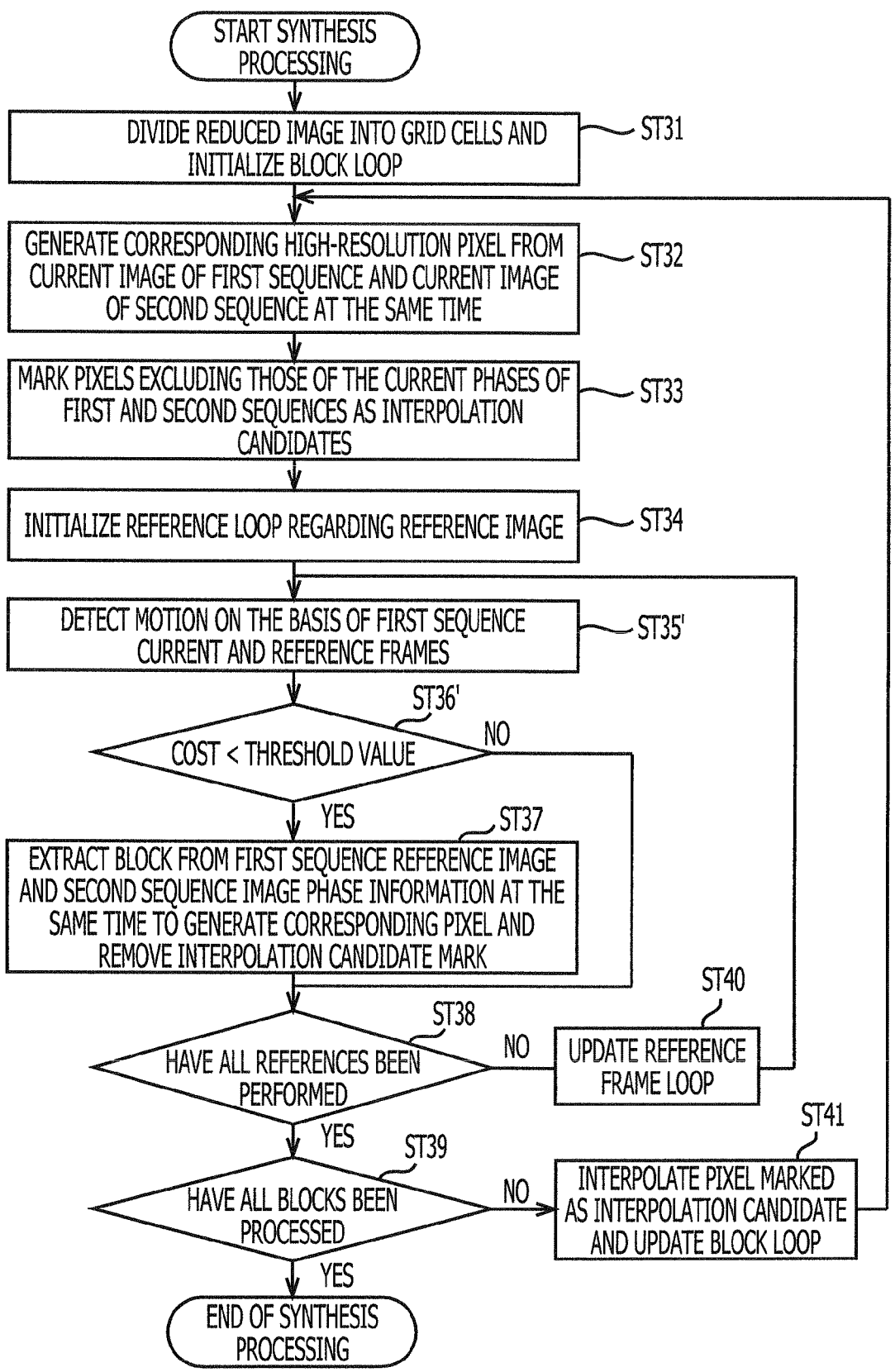
FIG. 11 illustrates an exemplary image processing.

FIG. 10 and FIG. 11 illustrate an exemplary image process. The moving-image processing apparatus illustrated in FIG. 6 may perform the image process illustrated in FIG. 10 and FIG. 11.

Referring to FIG. 10 and FIG. 11, motion detection for block matching may be used. The rest of the configurations illustrated in FIG. 10 and FIG. 11 may be substantially the same or similar to the configurations in FIG. 7 to FIG. 9. In FIG. 10, the grid (lattice) may have a fractional-pel accuracy of 0.5 on a reduced image and may support a high resolution pixel grid.

Referring to FIG. 7 to FIG. 9, it may be determined that one block position such as block coordinates in the first sequence SI1 is still in the current frame CF and the previous and subsequent frames PF and NF.

Referring to FIG. 10 and FIG. 11, a SAD may be used as the similarity, for example. The result of addition of the size of vector images, the weight based on the distance between frames and the SAD is set as a cost. The position having a lower cost than a certain threshold value and finally having the most similarity may be set as a motion vector.

If they are not similar, for example, if the cost is equal to or higher than the certain threshold value, the block may be set as a motion compensation target. Because the weight is controlled toward the direction that the motion of a farther frame in time is not trusted, the weight may not be considered. The interpolation pixels may be generated in substantially the same manner.

For example, referring to FIG. 10, the current frame CF moves to the upper right direction about the previous frame PF, and the frame NF moves to the upper right direction about the current frame CF.

A frame is divided into grid blocks, and motion detection is performed by using block matching in the current frame CF and the previous and subsequent frames PF and NF of the first sequence SU.

For example, the motion estimation (ME) may be performed to detect a motion vector based on matching of the block including the previous frame PF and current frame CF of the first sequence SI1, for example, pixels P11, P13, P31 and P33.

The motion estimation (ME) may be performed to detect a motion vector based on the matching of the block including the current frame CF and subsequent frame NF of the first sequence SI1, for example, the pixels P11, P13, P31 and P33.

Referring to FIG. 10, after coordinate correction is performed based on the detected motion vector, for example, it may be determined that there is no movement between the current frame CF and the previous and subsequent frames PF and NF illustrated in FIG. 7.

In second sequence SI2, after the coordinates are corrected based on the detected motion vector, for example, the frames PF, CF and NF are set as reference images in three-frame circulation, for example, as illustrated in FIG. 7.

For example, as illustrated in FIG. 10, in the second sequence SI2, the frames PF and NF before and after the coordinate correction based on the detected motion vector are set as reference images. Motion compensation (MC) is performed to synthesize a high resolution image such as a 4k2k image.

If matched blocks are not detected, for example, if the cost is higher than the certain threshold value, the block is not set as the motion compensation target. In this case, interpolation pixels may be generated.

For example, when a plurality of reference images are used, and when there exists a block including interpolated pixels and on which motion compensation is newly to be performed at substantially the same phase, the closer frames in time may be given priority in the block matching, or the average may be used. Alternatively, the synthesis may be performed with a weight in consideration of the distance to the target frame in time, or overwriting may be performed thereon. Alternatively, the priority order may be determined based on the certain order of reference frames.

If no pixels have been compensated based on a reference image, the interpolation may be performed based on the pixels of the current first and second frames, for example.

The image processing illustrated in FIG. 11 may include a different operation from operations ST35 and ST36 illustrated in FIG. 9.

For example, when the synthesis process is started, a reduced image is divided into grid cells, and the block loop is initialized in the operation ST31. The process moves to the operation ST32.

In the operation ST32, a high resolution image is generated based on the current image of the first sequence and the current image at substantially the same time of the second sequence. The process moves to the operation ST33. In the operation ST33, interpolation candidates and marks may be generated for the pixels which do not have the current phase of the first and second sequences.

The process moves to the operation ST34. The reference loop regarding reference images is initialized, and the process moves to an operation ST35'. Motion detection may be performed based on the current images of the first sequence and the reference frame. The process moves to an operation ST36'.

In the operation ST36', the COST and a threshold value are compared. The COST may be calculated by using the SAD as the similarity, for example, and adding the weight based on the vector size and inter-frame distance and the SAD. Other methods such as SSD may be used instead of SAD.

If the COST is lower than the threshold value (COST<threshold value), the process moves through the operation ST37 to the operation ST38. If the COST is not lower than the threshold value, the process moves to the operation ST38.

The position where COST<threshold value is satisfied and the similarity is the highest may be set as the motion vector.

The coordinates of the frames of the second sequence may be corrected based on the detected motion vector, for example.

In the operation ST37, a block is extracted based on the first sequence reference image and the phase information of the second sequence reference image at the same time, and pixels are generated. The interpolation candidates are unmarked, and the process moves to the operation ST38. In the operation ST38, whether all reference images have been processed or not is determined. When the all reference images have been processed, the process moves to the operation ST39.

In the operation ST39, whether all blocks have been processed or not is determined. When all blocks have been processed, the synthesis process ends. When all blocks have not been processed, the process moves to the operation ST41.

If all reference images have been processed in the operation ST38, the process moves to the operation ST40. The loop for reference frames is updated, and the process returns to the operation ST35'. In the operation ST38, the above-mentioned process may be repeated until it is determined that all reference images have been processed.

In the operation ST41, the pixels marked as interpolation candidates are interpolated, and the block loop is updated. The process returns to the operation 32, and the above-mentioned process above is repeated.

As illustrated in FIG. 10 and FIG. 11, when the block matching is used for the motion detection, the number of memories and/or processing circuits may increase, or a high resolution image having high image quality may be acquired.

In the motion detection or still-state determination, the pixels may not be mapped to a synthesis result or a high resolution image, for example, the pixels may not be compensated. In order to fill the gaps between pixels that are not compensated, interpolation pixels may be generated as an initial value by an interpolation such as 16-tap bi-cubic, bi-linear or a weighted average based on the first sequence.

The generated interpolation pixel may be overwritten by compensated pixels, or a weighted average may be calculated. Alternatively, pixels may be filled in the pixels which have not been mapped by interpolation.

FIGS. 12A to 12D and FIGS. 13A to 13E illustrate an exemplary interpolation process. The image processing apparatus illustrated in FIG. 6 may perform the interpolation process illustrated in FIGS. 12A to 12D and FIG. 13A to 13E.

Figure 12A:
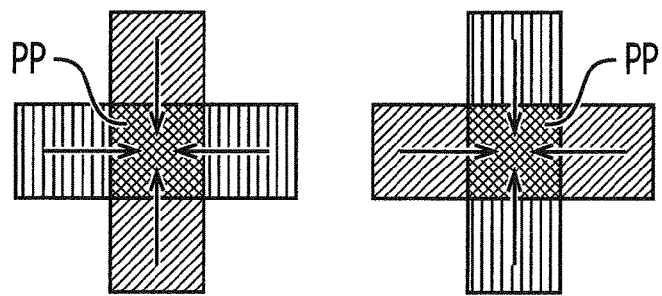
FIG. 12A to FIG. 12D illustrate an exemplary interpolation processing.
Figure 12B:
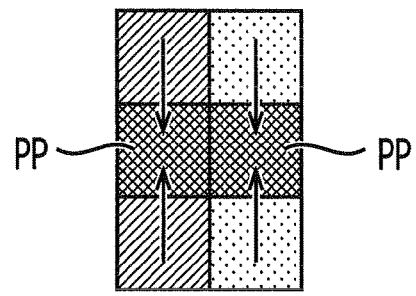

Referring to FIGS. 12A to 12D, an interpolation image is acquired from the upper and lower and left and right four pixels of a pixel PP marked as an interpolation target. Referring to FIG. 12B, an interpolation image is acquired from the two upper and lower pixels of the pixel PP.

Figure 12C:
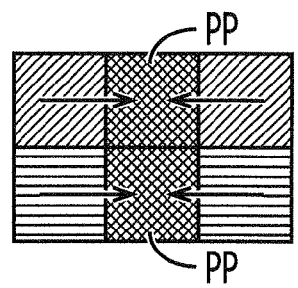
Figure 12D:
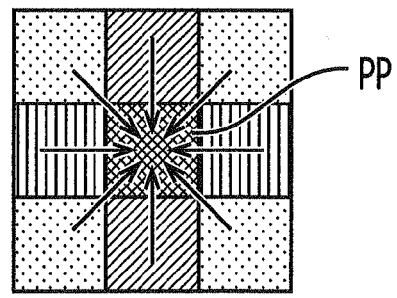

Referring to FIG. 12C, an interpolation image is acquired from the two left and right pixels of the pixel PP. Referring to FIG. 12D, an interpolation image is acquired from the adjacent eight pixels of the pixel PP. The interpolation image may be generated by using an average value.

Referring to FIG. 13A to 13E, an interpolation image may be generated based on outer pixels. An N-tap one-dimensional interpolation filter or a N×N two-dimensional interpolation filter is used to generate an interpolation image.

Figure 13A:
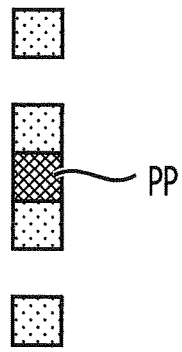
FIG. 13A to FIG. 13E illustrate an exemplary interpolation processing.
Figure 13B:
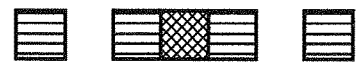

Referring to FIG. 13A, an interpolation image is acquired from the two upper and lower pixels and surrounding outer two pixels of the pixel PP illustrated in FIG. 12B. Referring to FIG. 13B, an interpolation image is acquired from the two left and right pixels and surrounding outer two pixels of the pixel PP illustrated in FIG. 12C.

Figure 13C:
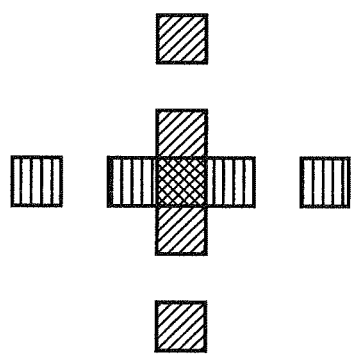
Figure 13D:
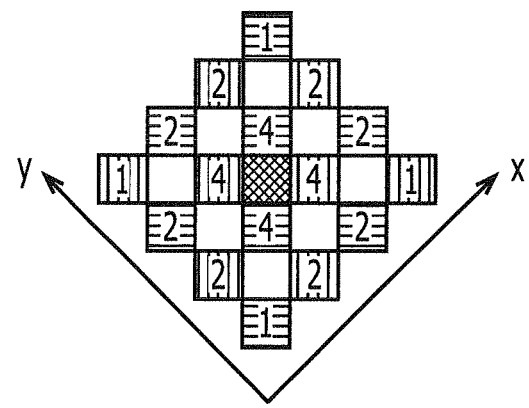

Referring to FIG. 13C, an interpolation image is acquired from the four upper and lower and left and right pixels and surrounding outer four pixels of the pixel PP illustrated in FIG. 12A. Referring to FIG. 13D, an interpolation image is acquired from the four upper and lower and left and right pixels and surrounding outer twelve pixels of the pixel PP illustrated in FIG. 12A.

Referring to FIG. 13D, the X-axis and Y-axis are set in the diagonal directions and are weighted in accordance with the distance from the interpolation image PP.

Figure 13E:
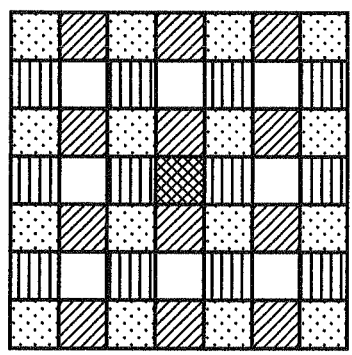

Referring to FIG. 13E, an interpolation image is acquired from the adjacent eight pixels and surrounding 32 pixels of the pixel PP illustrated in FIG. 12D.

Example embodiments of the present invention have now been described in accordance with the above advantages. It will be appreciated that these examples are merely illustrative of the invention. Many variations and modifications will be apparent to those skilled in the art.

The invention claimed is:

1. An image processing apparatus comprising:
a processor; and
a memory which stores a plurality of instructions, which when executed by the processor, cause the processor to:
detect motion based on a first block image within a first frame image included in first reduced image data sampled at a first sampling point and a first reference block image within a first reference frame image included in the first reduced image data; and
extract a second block image when detecting that the first block image and the first reference block image are not moving and generate first image data corresponding to the first block image based on the first block image and the second block image,
wherein the second block image is in a second frame image included in second reduced image data sampled at a second sampling point that is different from the first sampling point and is at substantially the same time as the time of the first block image or the first reference block image.

2. The image processing apparatus according to claim 1, wherein the first frame image and the second frame image correspond to low resolution image data, and the first image data corresponds to high resolution image data.

3. The image processing apparatus according to claim 1, wherein image data corresponding to the second block image is interpolated to generate the first image data when detection that the first block image and the first reference block image are moving.

4. The image processing apparatus according to claim 1, wherein the processor detects the motion based on the total sum of luminance differences between the first block image and the first reference block image.

5. The image processing apparatus according to claim 1, wherein the processor detects the motion based on a motion vector between the first block image and the first reference block image.

6. The image processing apparatus according to claim 1, wherein the processor is further configured to:
detect that the first block image and the first reference block image are still if a cost based on a motion vector between the position of the first block image and the position of the first reference block image is lower than a threshold value; and
detect that the first block image and the first reference block image are moving if the cost is equal to or higher than the threshold value.

7. An image processing method comprising:
detecting motion based on a first block image in a first frame image included in first reduced image data sampled at a first sample point and a first reference block image in a first reference frame image included in the first reduced image data;
extracting a second block image when detecting that the first block image and the first reference block image are not moving, the second block image being in a second frame image included in the second reduced image data, the second block image being sampled at a second sampling point that is different from the first sampling point at substantially the same time as the time of the first block image or the first reference block image; and
generating first image data corresponding to the first block image based on the first block image and the second block image.

8. The image processing method according to claim 7, wherein the first frame image corresponds to low resolution image data, and the second frame image corresponds to high resolution image data.

9. The image processing method according to claim 7, further comprising:
interpolating image data corresponding to the second block image when determining that the first block image and the first reference block image are moving; and
generating the first image data.

10. The image processing method according to claim 7, further comprising,
detecting the motion based on the total sum of luminance differences between the first block image and the first reference block image.

11. The image processing method according to claim 7, further comprising,
detecting the motion based on a motion vector between the first block image and the first reference block image.

* * * * *